US006918248B2

(12) United States Patent
Reiners et al.

(10) Patent No.: US 6,918,248 B2
(45) Date of Patent: Jul. 19, 2005

(54) INDEPENDENT METERING VALVE ASSEMBLY FOR MULTIPLE HYDRAULIC LOAD FUNCTIONS

(75) Inventors: Eric A. Reiners, Washington, IL (US); Steven T. Ufheil, East Peoria, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 0 days.

(21) Appl. No.: 09/836,751

(22) Filed: Apr. 17, 2001

(65) Prior Publication Data

US 2002/0148223 A1 Oct. 17, 2002

(51) Int. Cl.[7] ................................................ F16D 31/02
(52) U.S. Cl. ........................................................ 60/456
(58) Field of Search ............................ 60/456; 303/138

(56) References Cited

U.S. PATENT DOCUMENTS 3,151,455 A * 10/1964 Tennis ......................... 91/454
3,664,129 A * 5/1972 Schwab ....................... 60/468
4,062,329 A 12/1977 Rio
4,223,646 A 9/1980 Kinder
4,325,330 A 4/1982 Kugler et al.
4,348,990 A 9/1982 Nolte et al.
4,446,697 A 5/1984 Goscenski, Jr.
4,479,532 A 10/1984 Watanabe
4,487,255 A 12/1984 Bianchetta et al.
4,738,330 A * 4/1988 Suzuki et al. ................. 60/443
4,798,177 A 1/1989 Oomura et al.
4,945,723 A * 8/1990 Izumi et al. .................. 91/531
5,165,377 A 11/1992 Hosseini
5,216,983 A 6/1993 Nilson
5,359,969 A 11/1994 Dickrell et al.
5,531,190 A 7/1996 Mork
5,579,728 A 12/1996 Gotmalm
5,769,386 A 6/1998 Sugiura et al.
5,813,226 A * 9/1998 Krone et al. .................. 60/327
5,947,247 A 9/1999 Cummings, III
6,036,167 A 3/2000 Wade
6,216,457 B1 * 4/2001 Lubbers et al. ............ 60/547.2
6,314,729 B1 * 11/2001 Crull et al. ................... 60/456

* cited by examiner

*Primary Examiner*—F. Daniel Lopez
(74) *Attorney, Agent, or Firm*—Taylor & Aust, P.C.

(57) ABSTRACT

A hydraulic system, particularly suitable for use in a work machine, is provided with a hydraulic pressure source. A first hydraulic load is associated with a first load function. A second hydraulic load is associated with a second load function. An independent metering valve assembly includes a plurality of independently and electronically controllable valves. The independent metering valve assembly includes an inlet fluidly coupled with the pressure source, a first outlet fluidly coupled with the first hydraulic load, and a second outlet fluidly coupled with the second hydraulic load. The hydraulic system is configured such that the independent metering valve assembly may operate and drive multiple hydraulic load functions.

8 Claims, 1 Drawing Sheet

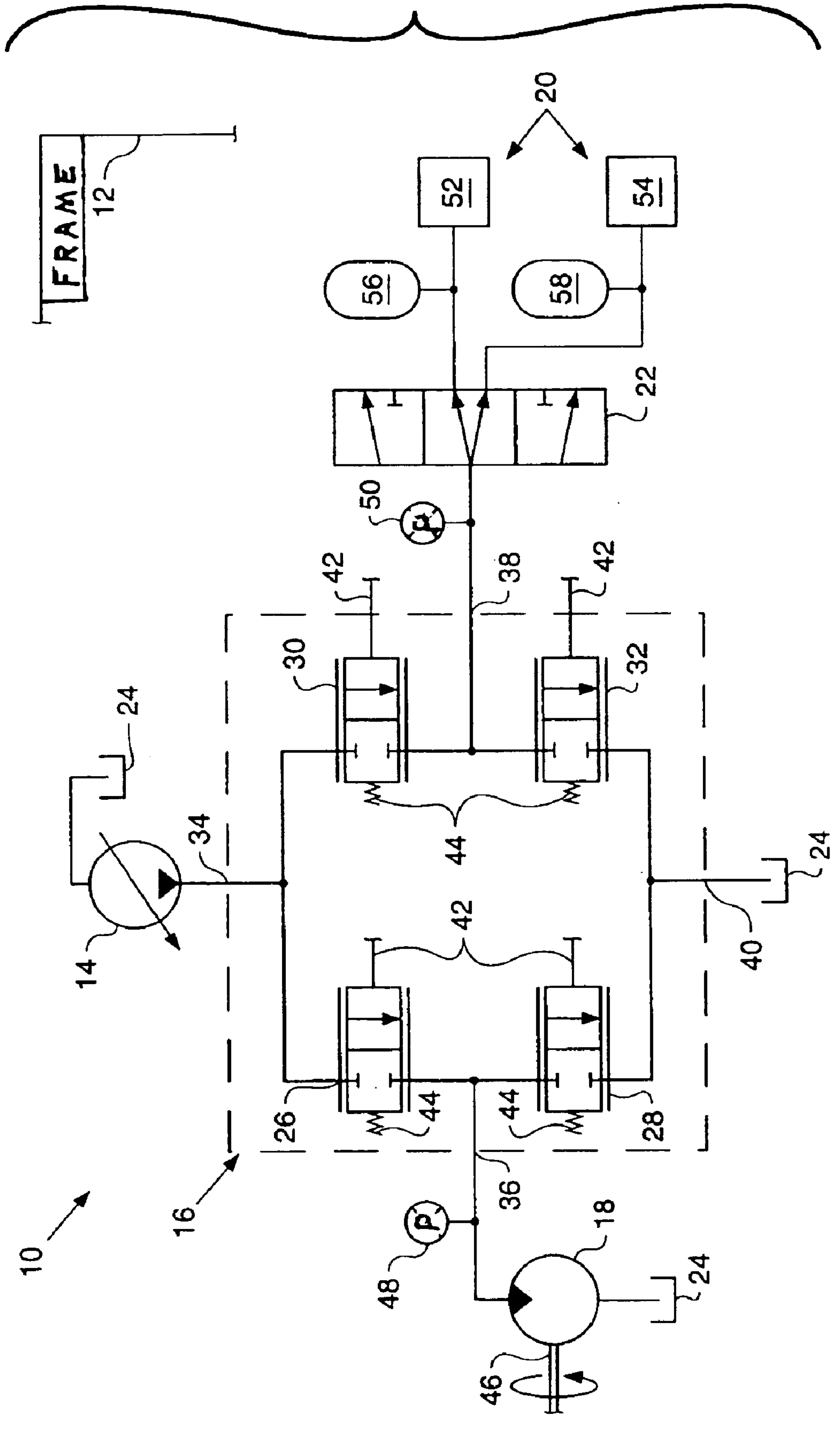
FRAME
12
10
14
16
18
20
22
24
26
28
30
32
34
36
38
40
42
44
46
48
50
52
54
56
58

INDEPENDENT METERING VALVE ASSEMBLY FOR MULTIPLE HYDRAULIC LOAD FUNCTIONS

TECHNICAL FIELD

The present invention relates to hydraulic systems, and, more particularly, to hydraulic systems used in conjunction with an internal combustion engine including an independent metering valve assembly.

BACKGROUND

A work machine such as a tractor, excavator, front end loader or the like typically includes an internal combustion engine providing motive force to the vehicle as well as providing power for auxiliary components. Auxiliary components may include hydraulic cylinders, hydraulic brakes, hydraulic fan motors, or other fluid actuated devices.

It is known to utilize an independent metering valve (IMV) assembly in association with an internal combustion engine. Such an independent metering valve assembly typically receives pressurized hydraulic fluid from a hydraulic pump and is in fluid communication with a single hydraulic load providing a single hydraulic function. For example, an IMV assembly may be fluidly coupled with a two-way hydraulic cylinder used for a single output function (e.g., tipping a loader bucket on a front end loader). The IMV assembly typically includes four independently controllable valves, with one pair of the valves being coupled with the head end of the hydraulic cylinder and the other pair of controllable valves being coupled with the rod end to the cylinder. Each pair of controllable valves in the IMV assembly allows flow both to and from the hydraulic cylinder. The controllable valves are electronically controlled using a controller, depending upon various input signals received from one or more sensors. An example of an IMV assembly utilized for a single hydraulic function is disclosed in U.S. Pat. No. 5,960,695 (Aardema et al.), which is assigned to the assignee of the present invention.

An auxiliary component in the form of a hydraulic fan motor as described above is used for cooling the internal combustion engine. However, cooling requirements for internal combustion engines are subject to wide variations depending upon operating conditions. When the engine is cold, little or no cooling is required. During engine operation, the necessary cooling typically varies as a function of engine load, and with external conditions such as air temperature and wind or vehicle velocity. Driving a hydraulic fan motor in a continuous manner may thus not be desirable both from a parasitic power consumption stand point as well as operating efficiency of the engine.

The present invention is directed to overcoming one or more of the problems as set forth above.

SUMMARY OF THE INVENTION

In one aspect of the invention, a hydraulic system is provided with a hydraulic pressure source. A first hydraulic load is associated with a first load function. A second hydraulic load is associated with a second load function. An independent metering valve assembly includes a plurality of independently and electronically controllably valves. The independent metering valve assembly includes an inlet fluidly coupled with the pressure source, a first outlet fluidly coupled with the first hydraulic load, and a second outlet fluidly coupled with the second hydraulic load.

In another aspect of the invention, a method of operating a hydraulic system is provided with the steps of: providing an independent metering valve assembly including a plurality of independently and electronically controllable valves, the independent metering valve assembly including an inlet, a first outlet and a second outlet; fluidly coupling the inlet with a pressure source; fluidly coupling the first outlet with a first hydraulic load associated with a first load function; fluidly coupling the second outlet with a second hydraulic load associated with a second load function; controlling the independent metering valve assembly to control flow from the pressure source through each of the inlet, the first outlet and the second outlet.

BRIEF DESCRIPTION OF THE DRAWINGS

FIG. 1 is a schematic representation of an embodiment of a hydraulic system of the present invention, incorporated in a work machine.

DETAILED DESCRIPTION

Referring now to FIG. 1, there is shown an embodiment of a hydraulic system 10 of the present invention utilized within a work machine, such as, for example, an excavator, front end loader, truck or tractor. For ease of illustration, only a portion of a frame 12 of the work machine is shown in FIG. 1. Frame 12 carries hydraulic system 10, which generally includes a pressure source 14, an IMV assembly 16, a first hydraulic load 18, a second hydraulic load 20, an adjustable valve 22 and a tank 24.

Pressure source 14 provides a source of pressurized hydraulic oil to hydraulic system 10. In the embodiment shown, pressure source 14 is in the form of a hydraulic pump.

IMV assembly 16 includes a plurality of independently and electronically controllable valves 26, 28, 30 and 32. More particularly, IMV assembly 16 includes a first controllable valve 26, a second controllable valve 28, a third controllable valve 30 and a fourth controllable valve 32. First controllable valve 26 and third controllable valve 30 are fluidly coupled in parallel with inlet 34 to IMV assembly 16. First controllable valve 26 is fluidly coupled between pump 14 and first hydraulic load 18 via first outlet 36 of IMV assembly 16. Third controllable valve 30 is fluidly coupled between pump 14 and second hydraulic load 20 via second outlet 38 of IMV assembly 16.

Second controllable valve 28 and fourth controllable valve 32 are fluidly coupled in parallel with third outlet 40 of IMV assembly 16, which in turn leads to tank 24. Second controllable valve 28 is fluidly coupled between first hydraulic load 18 and tank 24. Fourth controllable valve 32 is fluidly coupled between second hydraulic load 20 and tank 24. It is recognized that, the second controllable valve 26 would not be used if first hydraulic load 18 is a fluid motor driving a fan or the like.

In the embodiment shown, controllable valves 26, 28, 30 and 32 are electrically controlled and infinitely adjustable valves which are controllable between a completely closed position, and a completely open position, as indicated. Electric lines 42 respectively extending from each controllable valve 26, 28, 30 and 32 are in turn electrically coupled with a controller (not shown) which independently controls operation of each respective controllable valve. Each controllable valve 26, 28, 30 and 32 is biased to a closed position, as indicated by springs 44.

First hydraulic load 18, in the embodiment shown, is in the form of a fan motor used to cool an internal combustion engine. Fan motor 18 includes an output shaft 46 coupled with a fan blade (not shown) for cooling the internal combustion engine. Fan motor 18 is driven such that output shaft 46 has a desired maximum rotational speed depending upon engine operating conditions. The speed at which output shaft 46 rotates is dependent upon the flow conditions of the hydraulic fluid flowing through fan motor 18. Fan motor 18 discharges the spent hydraulic fluid to tank 24.

A first pressure sensor 48 and a second pressure sensor 50 are respectively fluidly coupled with first outlet 36 and second outlet 38. First pressure sensor 48 and second pressure sensor 50 are preferably incorporated into IMV assembly 16. First pressure sensor 48 and second pressure sensor 50 each are electrically coupled with and provide an output signal to the controller (not shown) which influences operation of controllable valves 26, 28, 30 and 32.

Second hydraulic load 20, in the embodiment shown, is in the form of a pair of brakes 52 and 54 on a work machine. Each brake 52 and 54 is fluidly coupled with an accumulator 56 and 58, respectively. Each accumulator 56 and 58 acts to store hydraulic energy for use by the respective brake 52 or 54. Brakes 52 and 54 may be in any suitable form, such as spring applied and pressure release brakes utilizing hydraulic energy.

Adjustable valve 22 interconnecting second outlet 38 with second hydraulic load 20 is a hydro-mechanical valve which, switches to direct flow to accumulator 56 or accumulator 58, dependent upon which accumulator has a lower pressure therein. Alternatively, valve 22 may be configured as an electrically controllable and infinitely adjustable valve to control fluid flow to brake 52 and/or brake 54. If configured electrically, the valve may likewise be electrically coupled with the controller via a suitable electric line for variable control thereof, dependent upon operating conditions.

INDUSTRIAL APPLICABILITY

During use, pump 14 applies pressurized hydraulic oil to inlet 34 of IMV assembly 16. First controllable valve 26 and third controllable valve 30 are independently controlled using the controller to control the flow rate and/or pressure of the hydraulic fluid which is applied to fan motor 18 and/or brakes 20. First pressure sensor 48 and second pressure sensor 50, which would normally be used for sensing pressure at the head end and rod end of a hydraulic cylinder in a conventional use of IMV assembly 16, provide respective output signals to the controller for independent control of first controllable valve 26 and third controllable valve 30. If desirable, the second controllable valve 28 could be used to controllably bypass fluid being directed to the first hydraulic load 18. Fourth controllable valve 32 can be used to exhaust flow from brakes 20. Operation of first hydraulic load 18 and second hydraulic load 20 is mutually exclusive. Charging of brakes 52, 54 has priority over operation of cooling fan 18. When brakes 52, 54 need charging, the oil is first directed to brakes 52, 54. An internal crossover relief valve within the motor allows the fan to continue spinning when this occurs.

The hydraulic system of the present invention is configured such that the independent metering valve assembly accommodates multiple hydraulic load output load functions. Controllable valves within the independent metering valve assembly are separately and independently controlled to control the flow rate and pressure of hydraulic fluid being applied to the multiple hydraulic loads. Depending upon the particular configuration of the output hydraulic load, the controllable valves are also independently controlled to allow return flow from one or more hydraulic loads to a tank coupled with an additional outlet from the IMV assembly. The pressure and/or flow rate that is applied to each output hydraulic load can be controlled using pressure sensor signals associated with each pressurized outlet from the IMV assembly. Preferably, such pressure sensors are incorporated into the IMV assembly and thus simplify the packaging of the hydraulic system. The hydraulic system of the present invention therefore provides a greater degree of freedom in controlling multiple output hydraulic loads using an already existing pump on an internal combustion engine and a prepackaged IMV assembly.

Other aspects, objects and advantages of this invention can be obtained from a study of the drawings, the disclosure and the appended claims.

What is claimed is:

1. A hydraulic system comprising a hydraulic pressure source;

a tank;

a first hydraulic load associated with a first load function;

a second hydraulic load associated with a second load function; and an independent metering valve assembly comprising: a first controllable infinitely variable valve being structured and arranged to control flow between the hydraulic pressure source and the first hydraulic load and a second controllable infinitely variable valve being structured and arranged to control flow between the hydraulic pressure source and the second hydraulic load, said first and second controllable infinitely variable valves having inlets concomitantly fluidly connected to the hydraulic pressure source through a common inlet, wherein said first load being independently and separably operable relative said second load through said first controllable valve, said first hydraulic load including one of a fan motor and a brake, and said second hydraulic load including the other one of the fan motor and the is brake.

2. The hydraulic system of claim 1, said second hydraulic load including a pair of brakes, and including an adjustable valve fluidly interconnecting said second outlet with each of said brakes, said adjustable valve controlling an amount of flow from said second outlet to each of said brakes.

3. A hydraulic system, comprising:

a hydraulic pressure source;

a first hydraulic load associated with a first load function;

a second hydraulic load associated with a second load function, the second hydraulic load including a pair of brakes;

an independent metering valve assembly including a plurality of independently and electronically controllable valves, said independent metering valve assembly including an inlet fluidly coupled with said pressure source, a first outlet fluidly coupled with said first hydraulic load, and a second outlet fluidly coupled with said second hydraulic load; and an adjustable valve controlling an amount of flow from said second outlet to each of said brakes.

4. A work machine, comprising:

a frame;

a hydraulic system carried by said frame, said hydraulic system including:

a hydraulic pressure source;

a first hydraulic load associated with a first load function;

a second hydraulic load associated with a second load function, the second hydraulic load including a pair of brakes;

an independent metering valve assembly including a plurality of independently and electronically controllable valves, said independent metering valve assembly including an inlet fluidly coupled with said pressure source, a first outlet fluidly coupled with said first hydraulic load, and a second outlet fluidly coupled with said second hydraulic load; and an adjustable valve controlling an amount of flow from said second outlet to each of said brakes.

5. A method of controlling output of a first hydraulic load and a second hydraulic load using a common independent metering valve assembly, the method comprising:

directing fluid from a pressure source to a first hydraulic load through a first a controllable infinitely variable valve;

communicating fluid from the pressure source to a second hydraulic load through a second controllable infinitely variable valve; and controlling flow downstream of one of the first or second hydraulic loads through a third controllable infinitely variable valve being fluidly connected between the one of the first or second hydraulic loads and a tank;

wherein the first hydraulic load consists of a fan system and the second hydraulic load consists of a braking system.

6. The method of claim 5, further comprising the step of directing priority flow to the braking system.

7. A hydraulic system, comprising:

a hydraulic pressure source;

a tank;

a first hydraulic load associated with a first load function;

a second hydraulic load associated with a second load function; and an independent metering valve assembly comprising: a first controllable valve being structured and arranged to control flow between the hydraulic pressure source and the first hydraulic load and a second controllable valve being structured and arranged to control flow between the hydraulic pressure source and the second hydraulic load, said first and second controllable valves having inlets concomitantly fluidly connected to the hydraulic pressure source through a common inlet, wherein said first load being independently and separably operable relative said second load through said first controllable valve; and said second hydraulic load including a pair of brakes, and including an adjustable valve fluidly interconnecting said second outlet with each of said brakes, said adjustable valve controlling an amount of flow from said second outlet to each of said brakes.

8. A method of controlling output of a first hydraulic load and a second hydraulic load using a common independent metering valve assembly, the method comprising:

directing fluid from a pressure source to a first hydraulic load through a first controllable valve;

communicating the directed fluid from the pressure source to a second hydraulic load through a second controllable valve; and controlling flow downstream of one of the first or second hydraulic loads through a third controllable valve being fluidly connected between the one of the first or second hydraulic loads and a tank;

wherein the first hydraulic load consists of a fan system and the second hydraulic load consists of a braking system; and further comprising the step of directing priority flow to the braking system.

* * * * *